(12) United States Patent
Zhu

(10) Patent No.: US 11,097,731 B2
(45) Date of Patent: Aug. 24, 2021

(54) VEHICLE OVERSPEED AVOIDANCE BASED ON MAP

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 156 days.

(21) Appl. No.: 16/562,112

(22) Filed: Sep. 5, 2019

(65) Prior Publication Data

US 2021/0070295 A1 Mar. 11, 2021

(51) Int. Cl.
  *B60W 30/18* (2012.01)
  *B60W 50/00* (2006.01)
  *G05D 1/00* (2006.01)

(52) U.S. Cl.
  CPC ............ *B60W 30/18* (2013.01); *B60W 50/00* (2013.01); *B60W 2050/0014* (2013.01); *B60W 2520/10* (2013.01); *B60W 2520/16* (2013.01); *B60W 2555/60* (2020.02); *B60W 2556/60* (2020.02); *B60W 2720/106* (2013.01); *G05D 1/0088* (2013.01); *G05D 2201/0213* (2013.01)

(58) Field of Classification Search
  CPC .. B60W 30/18; B60W 50/00; B60W 2555/60; B60W 2520/16; B60W 2720/106; B60W 2520/10; B60W 2556/60; B60W 2050/0014; G05D 2201/0213; G05D 1/0088
  See application file for complete search history.

(56) References Cited

U.S. PATENT DOCUMENTS

| | | | |
|---|---|---|---|
| 2017/0240182 A1* | 8/2017 | Hatano | B60W 10/18 |
| 2020/0079373 A1* | 3/2020 | Ortmann | B60W 40/11 |
| 2020/0233414 A1* | 7/2020 | Akella | G06K 9/00825 |
| 2020/0302195 A1* | 9/2020 | Thelen | G06K 9/00818 |
| 2021/0053552 A1* | 2/2021 | Szczepaniak | B60W 10/18 |

* cited by examiner

*Primary Examiner* — Hunter B Lonsberry
*Assistant Examiner* — Jimin You
(74) *Attorney, Agent, or Firm* — Womble Bond Dickinson (US) LLP

(57) ABSTRACT

In one embodiment, driving faster than a speed limit can be avoided. In response to a current speed being greater than a local speed limit of the vehicle, a vehicle can determine a current vehicle pitch and determine a compensation acceleration to maintain constant velocity of the vehicle at the current vehicle pitch. A threshold control command is determined based on the current speed of the vehicle, and the compensation acceleration. The threshold control command determines whether the vehicle will accelerate or decelerate given the current vehicle pitch of the vehicle. If a driver's control command is greater than the threshold control command, the driver's control command can be overridden or modified to reduce the current speed of the vehicle.

20 Claims, 8 Drawing Sheets

| Current Speed | Acceleration | Control Command |
|---|---|---|
| ... | ... | ... |
| 701 | 702 | 703 |

VEHICLE OVERSPEED AVOIDANCE BASED ON MAP

TECHNICAL FIELD

Embodiments of the present disclosure relate generally to operating autonomous vehicles. More particularly, embodiments of the disclosure relate to systems and processes that reduce or prevent vehicle overspeed, based on map information.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Overspeeding (e.g., driving beyond a prescribed speed limit) is a dangerous behavior. A driver's speed can often increase to an unsafe level without the driver knowing (for example, due to a hilly road). If a vehicle moves beyond a safe speed, the driver's ability to respond to, and avoid, an unwanted contact is reduced. Further, an unwanted contact, such as a collision with another vehicle, a pole, or a pedestrian, can result in greater damage and harm if the vehicle is beyond a safe speed. For this reason, traffic signs are visible on most streets and highways that provide speed limit data, to remind drivers to stay within speed limits. It is not practical or practicable, however, to place such signs everywhere, and even if they were placed in more locations, there is no guarantee that the additional signs would be noticed by drivers that might be distracted or otherwise unaware of their speed.

Level 3 cars can help make driving more safe. Although drivers are still necessary in level 3 cars, level 3 cars are able to shift "safety-critical functions" to the vehicle, under certain traffic or environmental conditions. In level 3 cars, a driver is still present and can intervene if necessary, but the driver is not required to monitor each situation in the same way it does for level 1 and level 2 vehicles. A level 3 car can reduce over speeding.

BRIEF DESCRIPTION OF THE DRAWINGS

Embodiments of the disclosure are illustrated by way of example and not limitation in the figures of the accompanying drawings in which like references indicate similar elements.

FIG. 7 is a block diagram illustrating an example of a control calibration table according to one embodiment.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a process can be performed to reduce or avoid exceeding speed limits. A local speed limit is determined. If the current speed of a vehicle is greater than (or equal to) the speed limit of the road in which the vehicle is driving, a vehicle can modify or override a vehicle command (e.g., throttle or accelerator pedal position) to reduce the current speed of the vehicle. The process determines a current pitch of the vehicle, which can be influenced by how steep a surface is under the vehicle. A compensation acceleration of the vehicle is determined, the compensation acceleration being defined as acceleration required to maintain constant velocity or 'hold' of the vehicle at the current pitch. A threshold control command is determined based on the current speed of the vehicle and the compensation algorithm. This threshold control command can be described as command level that, if exceeded, will cause acceleration, and if not exceeded, will cause deceleration, given the current pitch of the vehicle. If the current control command, given manually by a driver, is greater than the threshold, then the process can override or reduce the human control command to reduce the current speed of the vehicle. A control command can be, for example, any of the following: a throttle command, acceleration command, pedal position, or numeric representation of any of the pre-mentioned.

Figure 1:
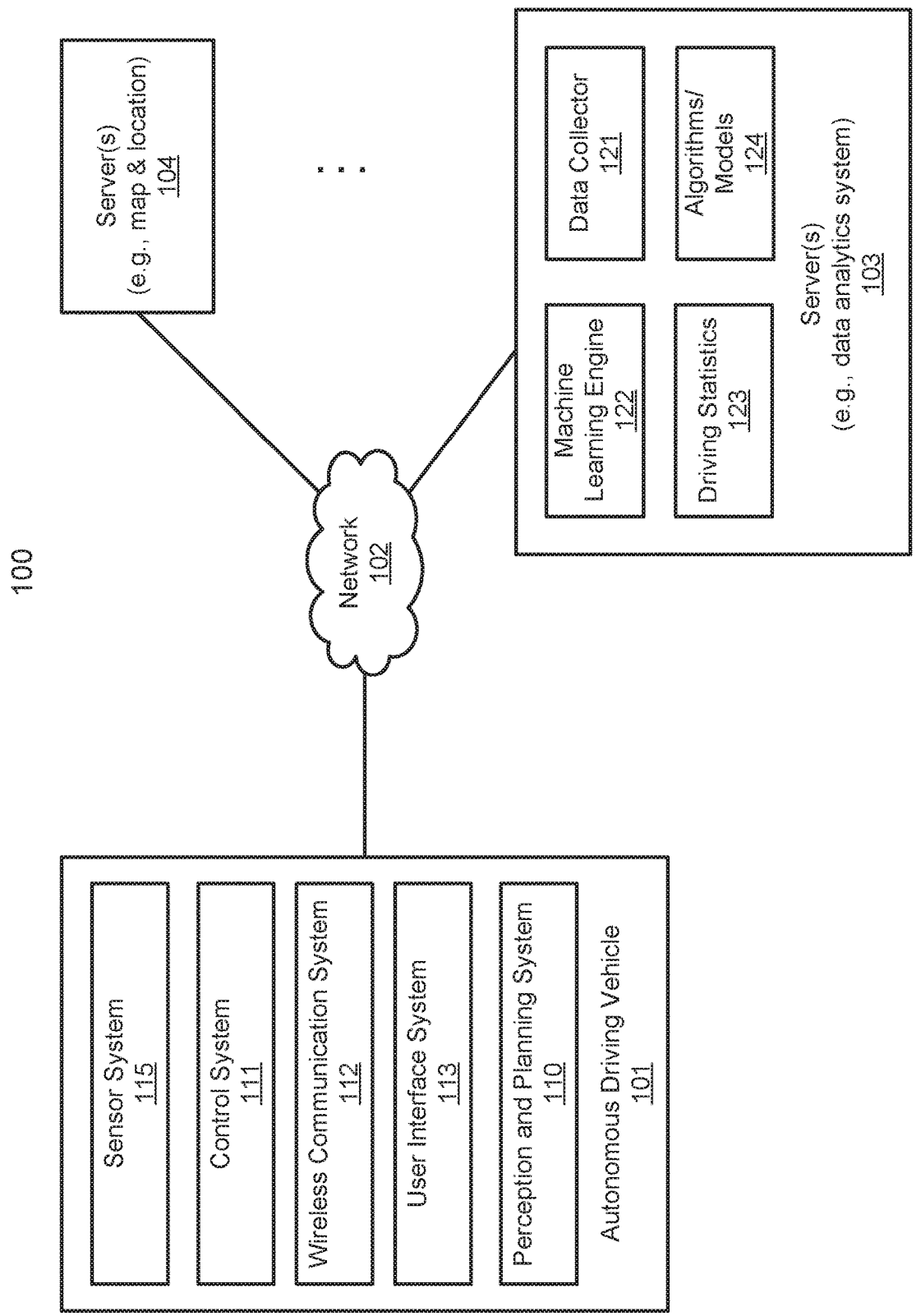
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
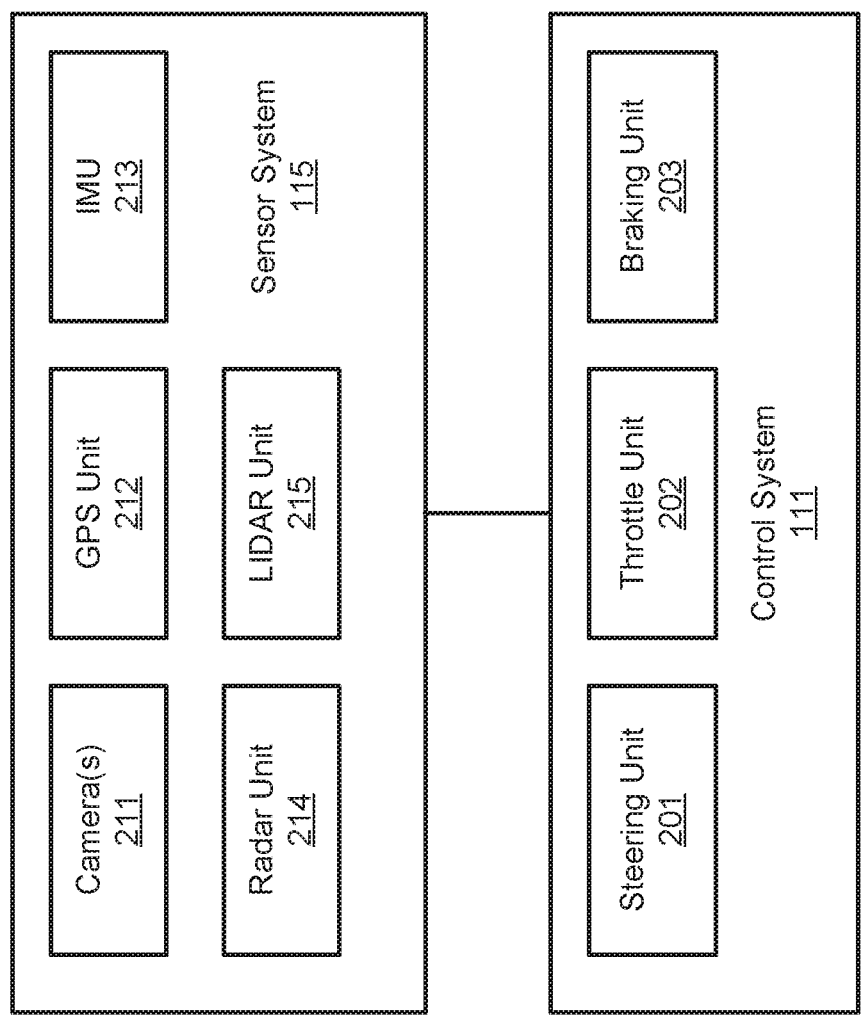
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

In one embodiment, MPOI servers can provide speed limit data given a location of the vehicle. For example, a vehicle can provide to server 104 a current location, and the server can provide a speed limit back to the vehicle, so that the vehicle can monitor its speed accordingly and avoid possible overspeed conditions, as described in FIG. 4 and FIG. 5.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 include a control calibration table for calibrating control commands and/or an algorithm for calculating pitch compensation values based on a pitch angle of a vehicle. Algorithms 124 can then be uploaded on ADVs to be utilized during autonomous driving in real-time.

Figure 3A:
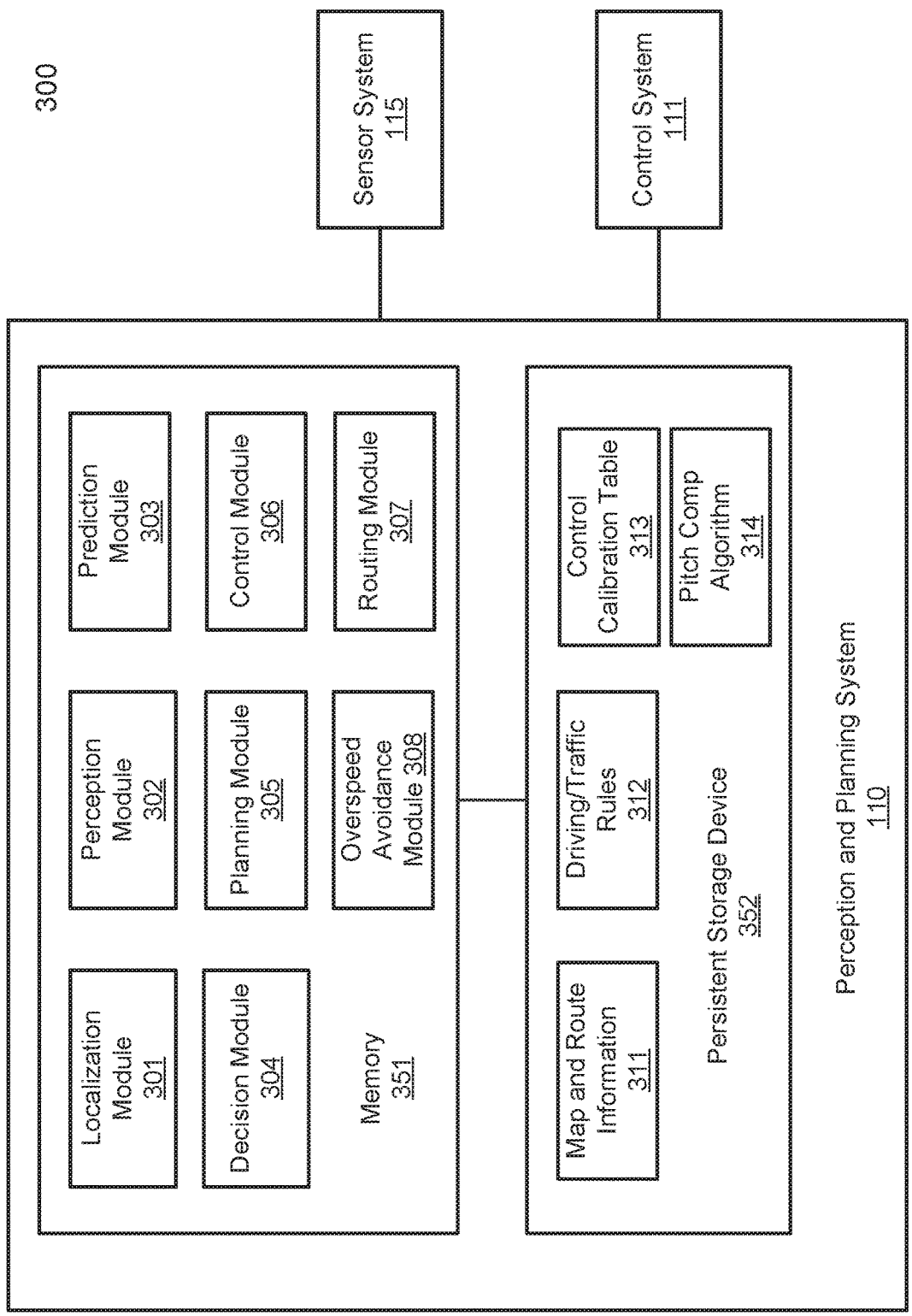
FIGS. 3A-3B are block diagrams illustrating an example of a perception and planning system used with an autonomous vehicle according to one embodiment.
Figure 3B:
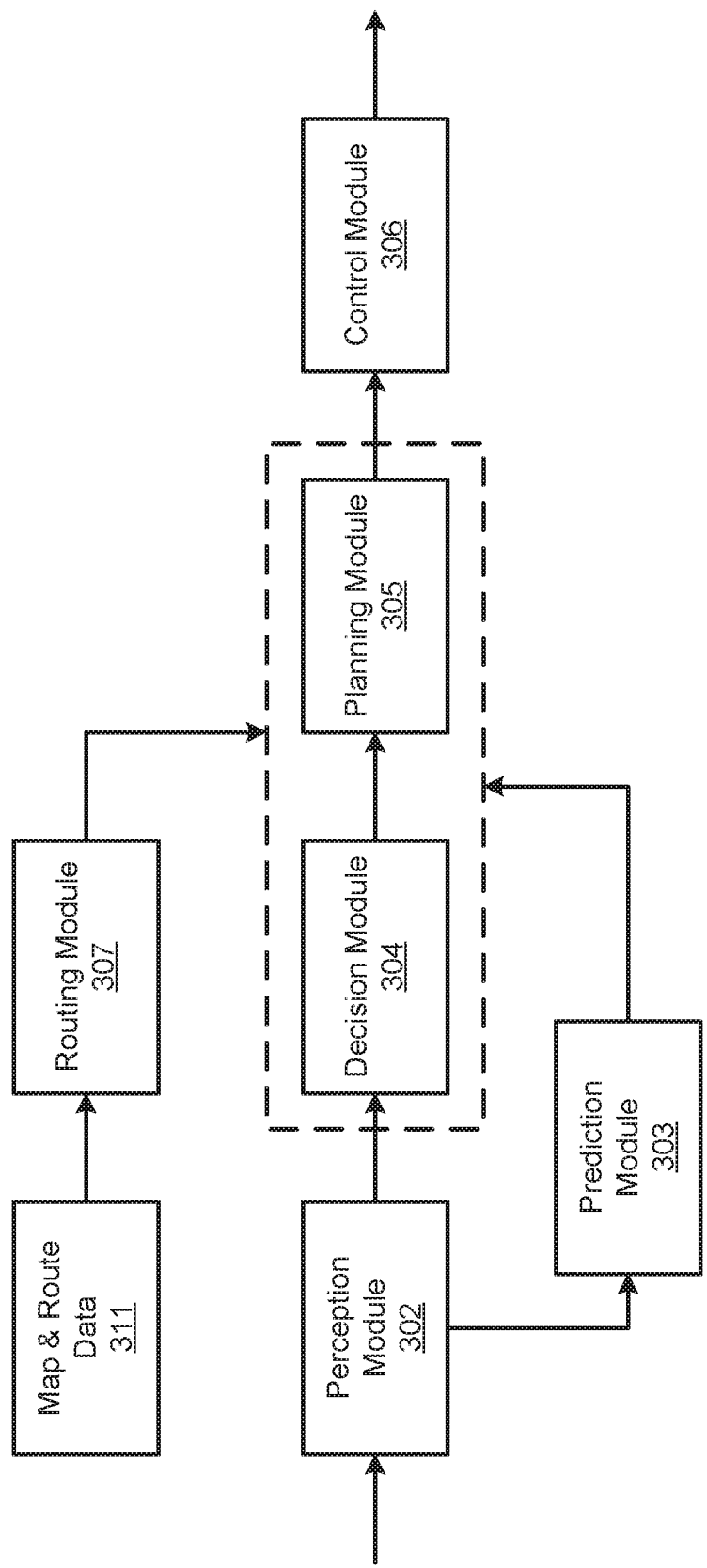

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and overspeed avoidance module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point.

For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, overspeed avoidance module 308 can be configured to perform a process that includes: determining a local speed limit of the vehicle; in response to a current speed of the vehicle being greater than the local speed limit of the vehicle, determining a current vehicle pitch of the vehicle; determining a compensation acceleration to maintain constant velocity of the vehicle at the current vehicle pitch; determining, based on a) the current speed of the vehicle, and b) the compensation acceleration, a threshold control command that determines whether the vehicle will accelerate or decelerate given the current vehicle pitch of the vehicle; and overriding a human control command with an override control command, if the human control command is greater than the threshold control command, to reduce the current speed of the vehicle. It should be noted that, although shown as separate, the overspeed avoidance module can be a sub-module of control module 306.

Specifically, according to one embodiment, in response to a first control comment (e.g., first throttle command) received from a driver of a vehicle (e.g., a level-3 autonomous driving vehicle), overspeed avoidance module 308 determines a current speed of the vehicle, which may be obtained using one or more sensors of the vehicle. In addition, overspeed avoidance module 308 further determines a current location of the vehicle and a current speed limit of a road in which the vehicle is driving. The current location of the vehicle can be determined based on GPS data obtained from a GPS receiver of the vehicle. The speed limitation can be obtained from map and route information 311, which may be obtained from a navigation map (e.g., normal Google or Baidu map, not necessarily a high-definition or HD map).

The overspeed avoidance module 308 compares the current speed of the vehicle and the current speed limit. If the current speed of the current is greater than the speed limit, a pitch angle of the vehicle is determined, which may be determined using an IMU device as described above. Based on the pitch angle of the vehicle, a pitch compensation calculator of overspeed avoidance module 308 is configured to calculate a pitch compensation value using a pitch compensation algorithm 314. Based on the pitch compensation value, an acceleration (or deceleration) is derived, where the acceleration represents the acceleration that is required in order to maintain the current speed in view of the pitch angle of the vehicle at the point in time.

Based on the acceleration (or deceleration), a command determination module of the overspeed avoidance module 308 is configured to determine a second control command based on the current speed of the vehicle and the acceleration required to maintain the same speed given the pitch angle of the vehicle. In one embodiment, the command determination module performs a lookup operation in control calibration table or data structure 313 to determine the second control command. The control calibration table 313 may be created based on prior driving statistics collected from many vehicles driving in a variety of driving environments (e.g., different speeds driving on roads with various pitch angles). An example of control calibration table 313 is shown in FIG. 7 according to one embodiment.

Referring now to FIG. 7, according to one embodiment, control calibration table 700 includes a number of mapping entries. Each mapping entry maps a particular speed 701 and a particular acceleration 702 to a control command 703. Based on the current speed of the vehicle and the acceleration determined based on the vehicle pitch, a mapping entry having speed field 701 and acceleration field 702 matching the current speed of the vehicle and the acceleration is located. The second control command is determined from field 703 of the matching entry. Control command 703 represents a control command (e.g., throttle command) that is required to maintain speed 701 and acceleration 702 on a given pitch angle (e.g., uphill or downhill road). Control command 703 can be a throttle command for acceleration or a brake command for deceleration. A negative value of acceleration 702 represents deceleration.

Referring back to FIGS. 3A-3B, once the second control command has been determined based on the control calibration table 313, a CAN bus module of overspeed avoidance module 308 compares the first control command and the second control command, and selects one of them whichever lower to control the vehicle. The CAN bus module of overspeed avoidance module 308 is configured to issue the selected control command to the vehicle to control the vehicle not to exceed the speed limit, while maintaining smoothing driving. In one embodiment, the CAN bus module does not issue a brake command. At most, the CAN bus module may simply cause the throttle or gas pedal to be released.

Figure 4:
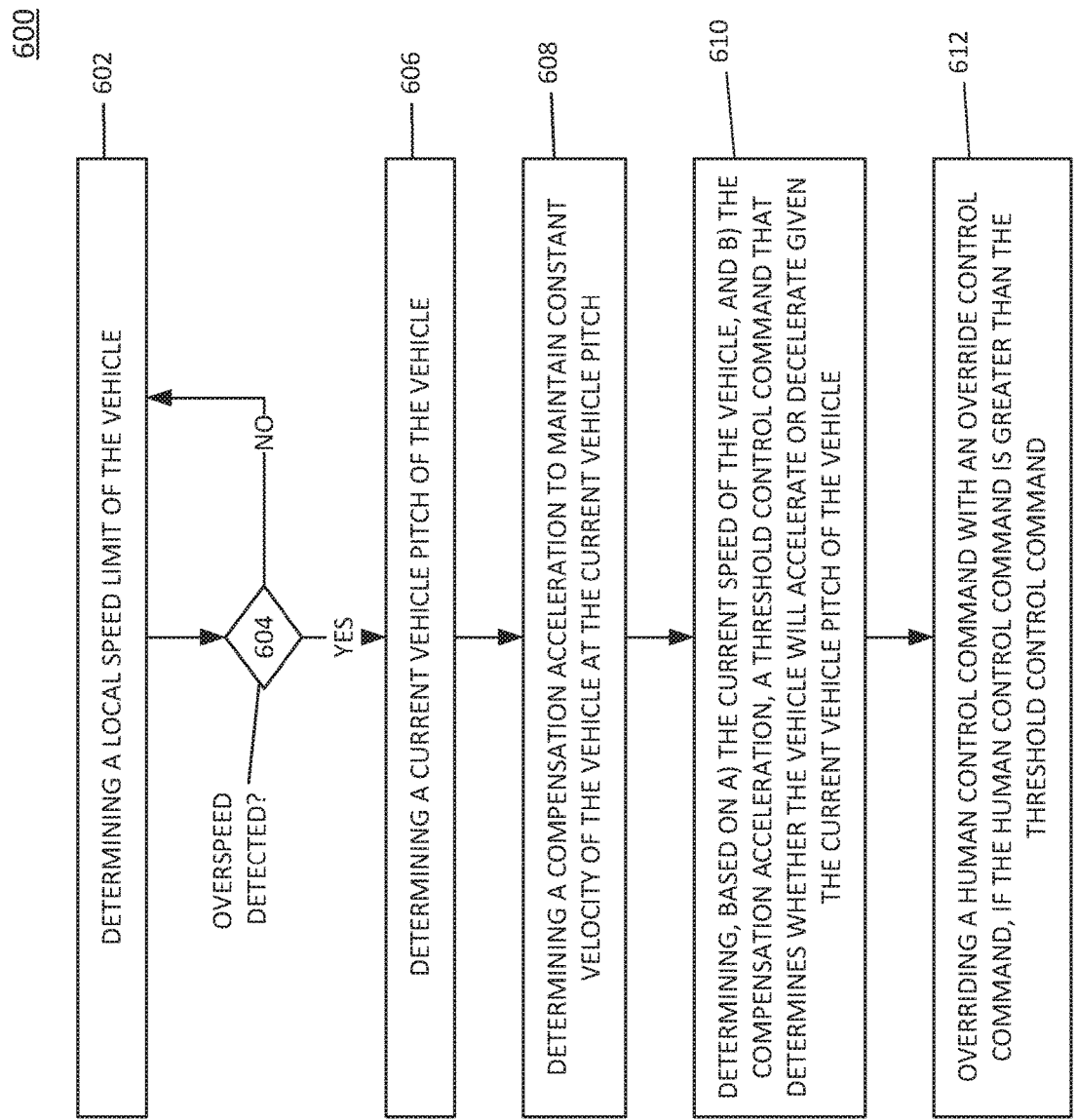
FIG. 4 is a block diagram illustrating a process for over speed avoidance according to one embodiment.

FIG. 4 shows a process 600 for providing overspeed avoidance according to one embodiment. Process 600 may be performed by processing logic which may include software, hardware, or a combination thereof. For example, process 600 may be performed by overspeed avoidance module 308. At block 602, the process includes determining a local speed limit of the road in which the vehicle is driving. The 'local' speed limit is the current speed limit that is applicable to the vehicle given the vehicle's current location. The local speed limit can be determined based on localization of the vehicle or other means, as described in other sections.

At block 604, the process includes detecting whether the vehicle velocity is beyond the speed limit. If the vehicle is beyond the speed limit, then an overspeed is detected and the process proceeds to avoid the overspeed. If not, then the process can continue to monitor whether overspeed occurs based on the current speed of the vehicle and local speed limit. In one embodiment, the overspeed detection can be based on the local speed limit and an offset. For example, if the local speed limit is 55 mph, then the overspeed detection can use 52 mph (offset by 3 mph) instead of 55 mph to provide additional safety and reaction time. In such a case, if the vehicle speed reaches 52 mph, then overspeed avoidance can be performed even though the speed limit is not reached.

In response to the current speed of the vehicle being greater than the local speed limit of the vehicle, the process performs overspeed avoidance, as described in blocks 606, 608, 610, and 612. Current speed can be provided via vehicle sensor system 115 shown in FIG. 2 and/or vehicle control system 111 of FIG. 1.

At block 606, the process includes determining a current vehicle pitch of the vehicle. This can be provided by vehicle sensors, for example, an IMU module (see for example, FIG. 2, sensor system 115 and IMU 213).

At block 608, the process includes determining a compensation acceleration to maintain constant velocity of the vehicle at the vehicle pitch. In other words, the compensation acceleration 'holds' velocity (maintains zero acceleration) of the vehicle when on a slope with the current detected vehicle pitch. The compensation acceleration at the current vehicle pitch is also an inversion of an acceleration of the vehicle calculated based on gravity and the current vehicle pitch. The compensation acceleration can be determined through calculations involving physics of the vehicle, as discussed in other sections.

At block 610, the process includes determining, based on a) the current speed of the vehicle, and b) the compensation acceleration of the vehicle, a threshold vehicle control command that determines whether the vehicle will accelerate or decelerate given the current pitch of the vehicle.

At block 612, the process includes overriding a human control command with an override control command, if the human control command (e.g., the driver's acceleration pedal position) is greater than the threshold control command. In such a manner, if a driver's control command is lower than the override command, then the vehicle will naturally decelerate, and no action is required. If, on the other hand, the driver's control command is higher than the override command, then the driver's control command is bypassed, overridden or modified with an override control command, to reduce the current speed of the vehicle. The override control command can be less than or equal to the threshold control command.

Figure 5:
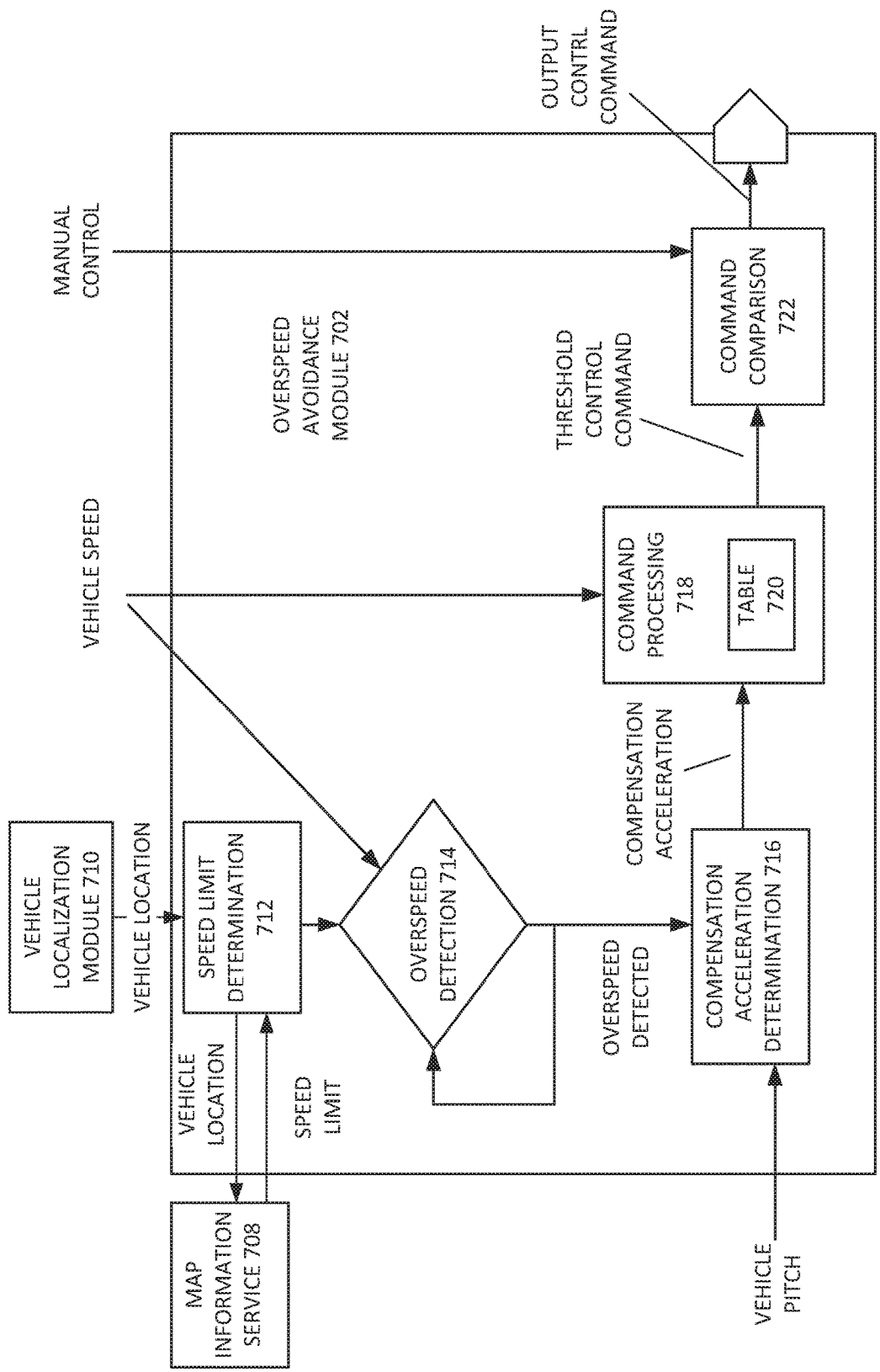
FIG. 5 is a block diagram illustrating an over speed avoidance module according to one embodiment.

FIG. 5 shows an overspeed avoidance module 702 that can perform overspeed avoidance, according to one embodiment. Overspeed avoidance module 702 may be implemented as part of module 308 of FIG. 3A. At block 712, a local speed limit is determined. The local speed limit determination can include determining a current location of the vehicle, and referencing map information (e.g., navigation map) or a table to look up the local speed limit with the current location of the vehicle. The current location of the vehicle can be determined by a vehicle localization module 710 and/or GPS (see also, FIG. 3A, localization module 301 and FIG. 2, GPS 212).

A map information service 708 can look up or reference a map or table, with the current location of the vehicle, to retrieve a corresponding speed limit that is local to the vehicle. Overspeed detection block 714 can compare the vehicle velocity, which can be determined by vehicle sensors, with the local speed limit. If the vehicle velocity is greater than the speed limit, then overspeed is detected.

Figure 6:
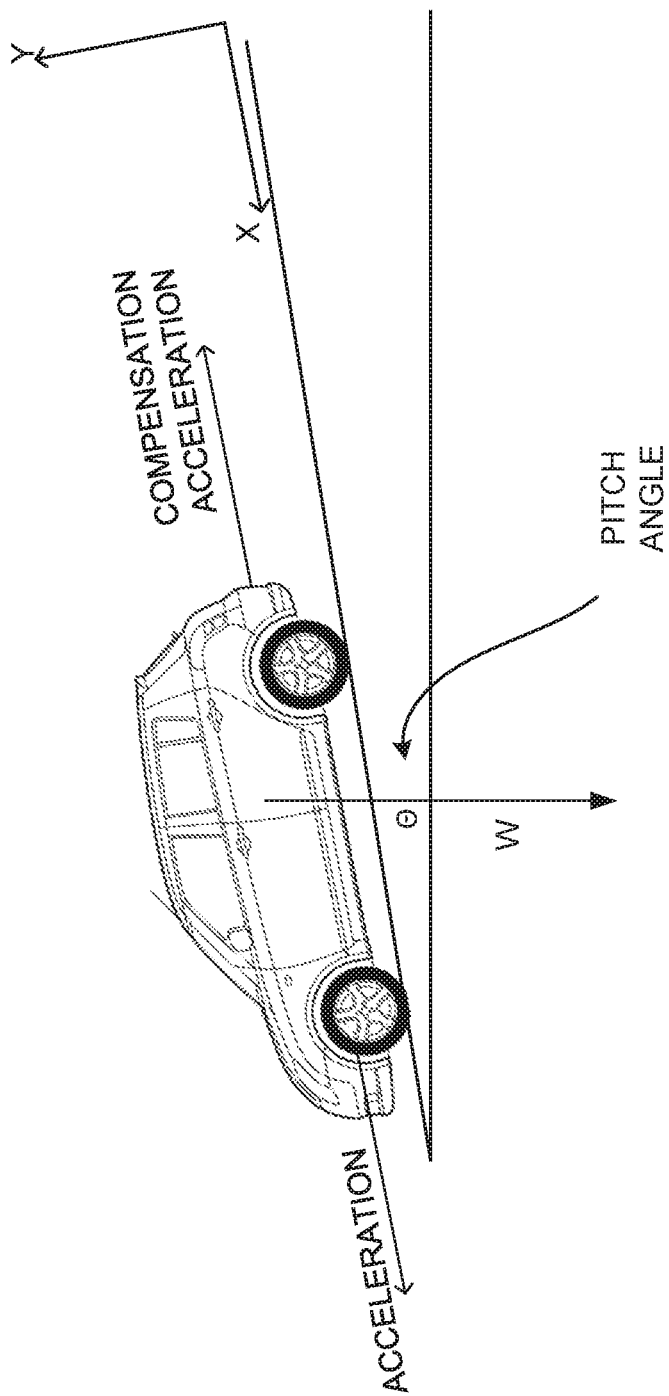
FIG. 6 illustrates an example of a vehicle on a sloped surface.

A compensation acceleration determination can be made at block 716 based on the vehicle's current pitch. The pitch of the vehicle can be sensed from an IMU unit which can have a combination of one or more gyroscopes and accelerometers. The compensation acceleration is illustrated in FIG. 6 as the opposing or inverse of the acceleration of the vehicle at the current pitch (having an angle θ). The acceleration of the vehicle in the x direction, caused by the down-facing slope, can be expressed as $a=(W*\sin(\theta))/M$, where W is the weight of the vehicle and M is the mass of the vehicle. Weight is given by mass (M)*gravity. The compensation acceleration can be the inverse of this acceleration, or the same but in the opposite direction. It should be noted that although the slope is shown as down-facing, the process, algorithm and calculation also applies in situations when the vehicle is traveling up-hill. In such a case, the driver might still need to reduce control command if over-speeding, only in this case, the slope of the hill works in favor of decelerating the vehicle, so threshold control command would be lowered or negative.

Referring back to FIG. 5, based on the compensation acceleration and the current vehicle speed, a command processing block 718 can determine a control command threshold where a control command greater than this threshold will cause the vehicle to accelerate and a control command less than the threshold will cause the vehicle to decelerate at the given pitch of the vehicle.

In one embodiment, the command processing block determines the threshold control command by referencing a calibration table 720. The calibration table can have a plurality of entries, each entry having a) a vehicle speed, b) a control command, and c) a resulting vehicle acceleration. Thus, given two of the parameters (e.g., vehicle speed and acceleration), a third parameter (e.g., a control command) can be determined. The calibration table can be referenced with a) the current speed of the vehicle and b) the calculated compensation acceleration, to extract the threshold control command. Data of the calibration table and the entries thereof can be determined through testing, either real or simulated.

In one embodiment, the threshold control command can be determined based on an algorithm such as a mathematical calculation or a curve. For example, an acceleration curve can be defined on an graph having vehicle speed on one axis and control command on a second axis. Acceleration can be plotted with respect to the vehicle speed and the control command. Similar to the above, given two parameters, a third can be determined.

At command comparison block 722, the threshold control command is compared to a driver's manual control command. If the driver's manual control command is greater than the threshold control command, the vehicle will continue to accelerate beyond the local speed limit. The comparison block can modify or override the driver's control command with an output control command that is less than or equal to the threshold control command, to reduce the vehicle speed below the speed limit.

The output or override control command can be a throttle command, and acceleration command, a pedal position, or a numeric value that represents the throttle command, the acceleration command, or the pedal position. The control command can be communicated to a vehicle power train via CANbus. For example, referring back to FIG. 2 and FIG. 3A, the overspeed avoidance module 308 can communicate, over CANbus, a control command to control system 111 that has a throttle unit 202. The throttle unit can use the override control command instead of the driver's manual control command (e.g., a pedal position) to command how much effort the power train exerts.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating a vehicle, the method comprising:
   in response to a first control command received from a driver of the vehicle,
      determining a local speed limit;
   in response to a current speed of the vehicle being greater than the local speed limit,
      determining a current vehicle pitch of the vehicle;
      determining a compensation acceleration to maintain constant velocity of the vehicle at the current vehicle pitch;
      determining, based on the current speed of the vehicle and the compensation acceleration, a threshold control command that determines whether the vehicle will accelerate or decelerate given the current vehicle pitch of the vehicle; and
      overriding the first control command with a second control command generated based on the threshold control command, if the first control command is greater than the threshold control command, to reduce the current speed of the vehicle.

2. The method of claim 1, wherein determining the local speed limit includes
   determining a current location of the vehicle; and
   referencing map information or a table to look up the local speed limit with the current location of the vehicle.

3. The method of claim 2, wherein the current location of the vehicle is determined based on a global positioning satellite (GPS) system.

4. The method of claim 1, wherein determining the threshold control command includes referencing a calibration table having a plurality of entries, each entry having a) a vehicle speed, b) a control command, and c) a resulting vehicle acceleration, with the current speed of the vehicle and the compensation acceleration to extract the threshold control command.

5. The method of claim 4, wherein data of the calibration table is determined based on past test data or simulated test data.

6. The method of claim 1, wherein the second control command is less than or equal to the threshold control command.

7. The method of claim 1, wherein the compensation acceleration at the current vehicle pitch is an inversion of an acceleration of the vehicle calculated based on gravity and the current vehicle pitch.

8. The method of claim 1, wherein determining the current vehicle pitch of the vehicle includes sensing pitch of the vehicle with an inertial measurement unit.

9. A non-transitory machine-readable medium having instructions stored therein, which when executed by a processor, cause the processor to perform operations of operating a vehicle, the operations comprising:
   in response to a first control command received from a driver of the vehicle,
   determining a local speed limit;
   in response to a current speed of the vehicle being greater than the local speed limit,
      determining a current vehicle pitch of the vehicle;
      determining a compensation acceleration to maintain constant velocity of the vehicle at the current vehicle pitch;
      determining, based on the current speed of the vehicle and the compensation acceleration, a threshold control command that determines whether the vehicle will accelerate or decelerate given the current vehicle pitch of the vehicle; and
      overriding the first control command with a second control command generated based on the threshold control command, if the first control command is greater than the threshold control command, to reduce the current speed of the vehicle.

10. The non-transitory machine-readable medium of claim 9, wherein the second control command is one of the following: a throttle command, an acceleration pedal position, an acceleration command, or a numeric value representation thereof.

11. The non-transitory machine-readable medium of claim 9, wherein the second control command is communicated to a power train of the vehicle over CAN bus.

12. The non-transitory machine-readable medium of claim 9, wherein determining the threshold control command includes referencing a calibration table having a plurality of entries, each entry having a) a vehicle speed, b) a control command, and c) a resulting vehicle acceleration, with the current speed of the vehicle and the compensation acceleration to extract the threshold control command.

13. The non-transitory machine-readable medium of claim 12, wherein data of the calibration table is determined based on past test data or simulated test data.

14. The non-transitory machine-readable medium of claim 9, wherein the second control command is less than or equal to the threshold control command.

15. The non-transitory machine-readable medium of claim 9, wherein the compensation acceleration at the current vehicle pitch is an inversion of an acceleration of the vehicle calculated based on gravity and the current vehicle pitch.

16. A data processing system, comprising:
   a processor; and
   a memory coupled to the processor to store instructions, which when executed by the processor, cause the processor to perform operations of operating a vehicle, the operations including
      in response to a first control command received from a driver of the vehicle,
   determining a local speed limit;
      in response to a current speed of the vehicle being greater than the local speed limit,
         determining a current vehicle pitch of the vehicle;
         determining a compensation acceleration to maintain constant velocity of the vehicle at the current vehicle pitch;
         determining, based on the current speed of the vehicle and the compensation acceleration, a threshold control command that determines whether the vehicle will accelerate or decelerate given the current vehicle pitch of the vehicle; and
         overriding the first control command with a second control command generated based on the threshold control command, if the first control command is greater than the threshold control command, to reduce the current speed of the vehicle.

17. The data processing system of claim 16, wherein determining the threshold control command includes referencing a calibration table having a plurality of entries, each entry having a) a vehicle speed, b) a control command, and c) a resulting vehicle acceleration, with the current speed of the vehicle and the compensation acceleration to extract the threshold control command.

18. The data processing system of claim 17, wherein data of the calibration table is determined based on past test data or simulated test data.

19. The data processing system of claim 16, wherein the second control command is less than or equal to the threshold control command.

20. The data processing system of claim 16, wherein the compensation acceleration is an inversion of an acceleration of the vehicle calculated based on gravity and the current vehicle pitch.

* * * * *